United States Patent
Berlinger et al.

(10) Patent No.: US 9,625,335 B2
(45) Date of Patent: Apr. 18, 2017

(54) CERAMIC PRESSURE MEASURING CELL

(75) Inventors: Andrea Berlinger, Baden-Baden (DE);
Ulfert Drewes, Mullheim (DE);
Michael Philipps, Lorrach (DE);
Andreas Rossberg, Bad Sackingen (DE); Elke Schmidt, Bad Sackingen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 218 days.

(21) Appl. No.: 14/000,450

(22) PCT Filed: Feb. 10, 2012

(86) PCT No.: PCT/EP2012/052305
§ 371 (c)(1),
(2), (4) Date: Aug. 20, 2013

(87) PCT Pub. No.: WO2012/113660
PCT Pub. Date: Aug. 30, 2012

(65) Prior Publication Data
US 2013/0327151 A1     Dec. 12, 2013

(30) Foreign Application Priority Data
Feb. 25, 2011   (DE) .................. 10 2011 004 722

(51) Int. Cl.
*G01L 9/00*     (2006.01)
(52) U.S. Cl.
CPC .............. *G01L 9/00* (2013.01); *G01L 9/0075* (2013.01)
(58) Field of Classification Search
USPC ........................................................ 73/756
See application file for complete search history.

(56) References Cited

U.S. PATENT DOCUMENTS

| 4,380,041 A | 4/1983 | Ho |
| 5,050,035 A | 9/1991 | Hegner |

(Continued)

FOREIGN PATENT DOCUMENTS

| CN | 10-58334 C | 11/2000 |
| CN | 1864054 A | 11/2006 |

(Continued)

OTHER PUBLICATIONS

Document U—Exner et al., Laser Welding of Functional and Constructional Ceramics, Jul. 15, 1999, Laser Applications in Microelectronic and Optoelectronic Manufacturing IV, San Jose, CA, Conference vol. 3618.*

(Continued)

*Primary Examiner* — Lisa Caputo
*Assistant Examiner* — Tran M Tran
(74) *Attorney, Agent, or Firm* — Bacon & Thomas, PLLC

(57) ABSTRACT

A pressure measuring cell includes at least one ceramic measuring membrane body; and at least one ceramic platform, wherein the measuring membrane body is connected with the platform along an annular, peripheral joint. The joint is formed as a welded connection between the measuring membrane body and the platform, wherein the measuring membrane body has a pressure-dependently deformable measuring membrane. A pressure sensor includes a pressure measuring cell and a housing, wherein the pressure measuring cell is held by the housing, and wherein the pressure measuring cell closes a housing opening, through which the pressure measuring cell communicates with an environment of the housing. A seal is clamped between a sealing surface surrounding the opening of the housing and a sealing surface of the pressure measuring cell.

13 Claims, 3 Drawing Sheets

(56) References Cited

U.S. PATENT DOCUMENTS

| | | | |
|---|---|---|---|
| 6,528,008 B1 * | 3/2003 | Bjoerkman | 264/650 |
| 7,107,855 B2 | 9/2006 | Bjoerkman | |
| 7,509,867 B2 * | 3/2009 | Takashima | A61B 5/03 361/283.1 |
| 2005/0000300 A1 | 1/2005 | Zingg | |
| 2006/0053893 A1 | 3/2006 | Banholzer | |
| 2012/0174681 A1 * | 7/2012 | Drewes et al. | 73/724 |

FOREIGN PATENT DOCUMENTS

| | | |
|---|---|---|
| DE | 3909185 A1 | 9/1990 |
| DE | 3942020 A1 | 4/1991 |
| DE | 10227479 A1 | 1/2004 |
| DE | 102009027742 A1 | 1/2011 |
| WO | 9934185 A1 | 7/1999 |

OTHER PUBLICATIONS

Horst Exner and Anne-Maria Nagel, Schweissen von Keramikbauteilen mit Hilfe von zwei Laserstrahlen, MM Maschinenmarket, Nr. 33, 1998, pp. 24-26.
International Search Report, European Patent Office, The Netherlands, May 9, 2012.
German Search Report, German Patent Office, Munich, Dec. 20, 2011.
English translation of International Preliminary Examination Report in corresponding International Application No. PCT/EP2012/052305, dated Sep. 6, 2013.

* cited by examiner

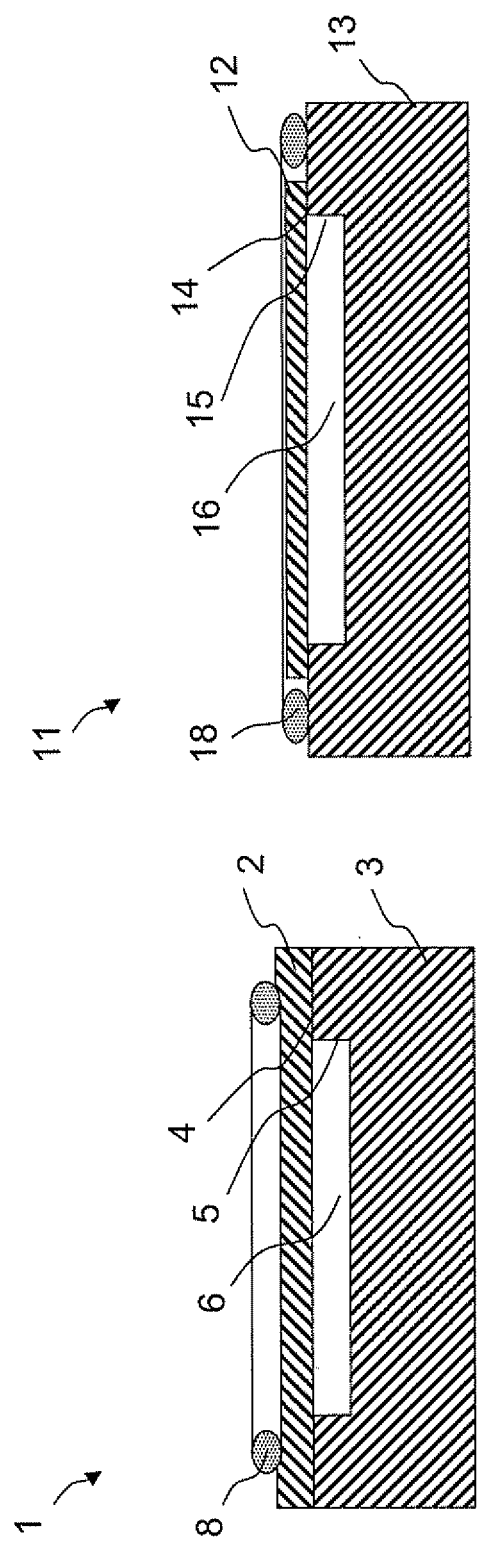

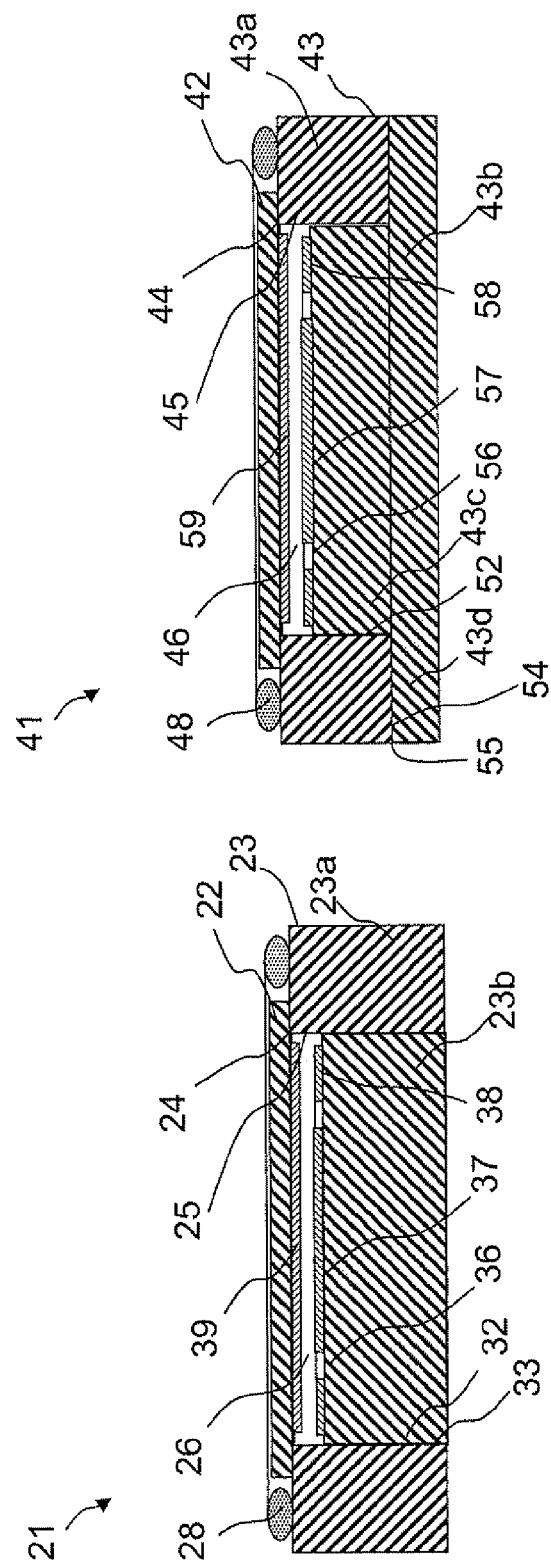

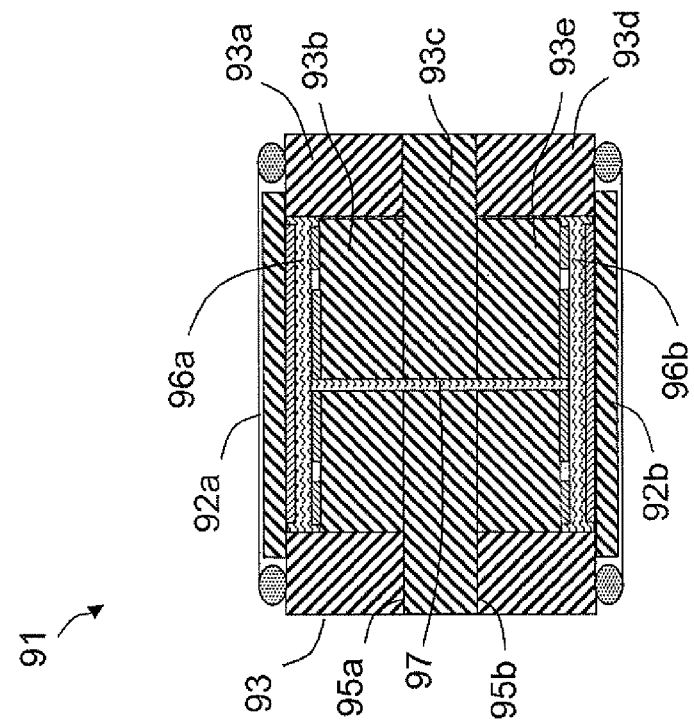
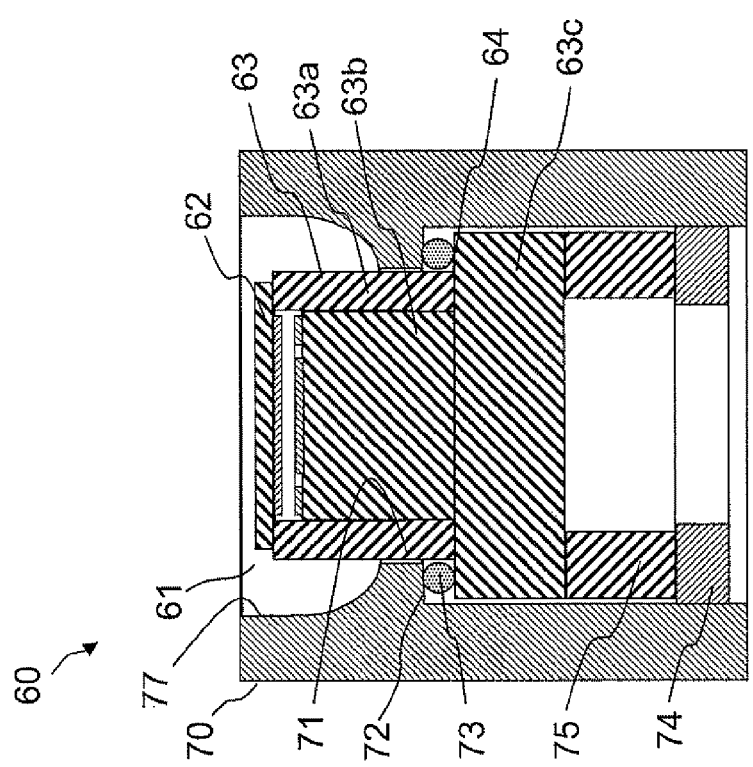
Fig. 6
Fig. 5

CERAMIC PRESSURE MEASURING CELL

TECHNICAL FIELD

The present invention relates to a ceramic pressure measuring cell, which has at least one measuring membrane and a platform.

BACKGROUND DISCUSSION

The measuring membrane is connected with the platform along an annular joint. Known materials for the joint are glass and active hard solders, or brazes. A pressure sensor joined with a glass solder is disclosed, for example, in German patent, DE 39420102B. An overview of the different approaches for manufacturing a joint with zirconium-nickel-titanium, active hard solder, or braze, is given in the as yet unpublished German patent applications DE 1020106365.9, DE 102009046844.7, DE 102009 054909.9 and the documents cited therein for the state of the art. The named materials basically fulfill their purpose, i.e. they serve to join the parts of pressure measurement cells with one another. However, use of these materials leads to limits for measuring cell design.

A basic cause therefor is the limited media resistance of the joint, from which, for pressure measurement cells of industrial process measurements technology, it follows that the joint needs to be protected from the measured medium. Insofar as the joint in the case of the, usually, cylindrical pressure measurement cells extends to their lateral surface, the protection of the joint results from the established, installed situation, wherein the pressure measuring cell is clamped axially in a sensor housing, wherein the pressure measuring cell end presses a sealing ring against an annular abutment surface, which surrounds a housing opening, through which the measuring membrane body is contactable at the end of the pressure measuring cell with a medium, whose pressure is to be measured.

Although the joint is, in this way, reliably protected from the medium, this requires an annular edge region of the end of the pressure measuring cell, thus the measuring membrane body, as bearing surface for the sealing ring, so that this edge region must be supported by the joint. With the trend being to make the diameter ever smaller, the relative proportion of this edge region on the end face grows, so that the deflectable part of the measuring membrane body available for the pressure measurement decreases disproportionately with the diameter of the pressure measuring cell. This sets limits for the miniaturization of pressure measurement cells.

Insofar as, with the decrease of the diameter of the pressure measuring cell, the relative area fraction of the joint compared with the deflectable area of the measuring membrane body disproportionately increases, differing thermomechanical properties between the material of the joint and the ceramic material of the measuring membrane body and of the platform gain with the miniaturization of the pressure measuring cell relatively in importance and can lead to warping and ultimately to measurement errors. These concerns discourage a miniaturization of the measuring cells.

Finally, reductions of the diameter of the pressure measuring cell lead in the case of pressure measurement cells with capacitive transducers to sinking capacitances. This can, indeed, be compensated theoretically by lessening the distance between platform and measuring membrane, respectively the electrodes mounted on the platform and measuring membrane. However, there are limits to this, since the material thickness of the established active hard solder, or braze, rings, with which the joint between platform and measuring membrane body is manufactured, is subject to a certain tolerance and is not manufacturable as thinly as desired.

SUMMARY OF THE INVENTION

It is, therefore, an object of the present invention to provide a pressure measuring cell, which overcomes the disadvantages of the state of the art, and especially is more easily scalable, especially miniaturizable. The object is achieved according to the invention by the pressure measuring cell as defined in independent patent claim 1.

The pressure measuring cell of the invention includes:
   at least one ceramic measuring membrane body; and
   at least one ceramic platform, wherein the measuring membrane body is connected with the platform along an annular, peripheral joint, wherein, according to the invention, the joint is formed as a welded connection between the measuring membrane body and the platform, wherein the measuring membrane body has a pressure-dependently deformable, measuring membrane.

In a further development of the present invention, the measuring membrane body and/or the platform comprise(s) aluminum oxide, especially corundum.

In a further development of the invention, the platform includes an annular membrane support, to which the measuring membrane body is secured by means of the peripheral joint.

In a further development of the invention, the pressure measuring cell includes a central transducer support, which is at least partially surrounded by the membrane support.

In a further development of the invention, an end face of the transducer support includes at least one electrode, which faces the measuring membrane body, wherein the measuring membrane includes an electrode, which faces the transducer support.

In a further development of the invention, the transducer support is connected, especially pressure-tightly, with the membrane support along at least a second joint, wherein the second joint is formed by means of a glass solder, an active hard solder, or braze, or by means of welding.

In a further development of the invention, the pressure measuring cell is producible by a method, which includes laser welding, especially by a method, which includes preheating the vicinity of the weld seam for reducing stresses, or voltages, in the welding. The preheating can occur especially with a $CO_2$-laser, wherein the actual welding can be done with an Nd-YAG laser.

In a further development of the invention, an inner lateral surface of the annular membrane support can have a conductive coating, which, together with an electrode on the surface of the measuring membrane facing the membrane support, forms a Faraday cage closed toward the measuring membrane and the lateral surface.

In a further development of the invention, the pressure measuring cell includes a bearing surface for a sealing ring, wherein an axial projection of the bearing surface onto a plane, in which the joint between the measuring membrane and the platform is formed, surrounds the joint.

In a further development of the invention, the pressure measuring cell includes a bearing surface for a sealing ring in a first plane, wherein the first plane is axially spaced from a second plane, in which an outer end face of the measuring membrane extends, and, indeed, by at least one eighth diameter, especially at least one fourth diameter, preferably at least one half diameter and especially preferably at least one whole diameter of the measuring membrane body.

In a further development of the invention, the pressure measuring cell is an absolute pressure-, relative pressure- or pressure difference, measuring cell.

A pressure sensor of the invention includes a pressure measuring cell as claimed in one of the preceding claims and a housing, wherein the pressure measuring cell is held by the housing, and wherein the pressure measuring cell closes a housing opening, through which the pressure measuring cell communicates with an environment of the housing, wherein a seal is clamped between a sealing surface of the housing surrounding the opening and a sealing surface of the pressure measuring cell.

BRIEF DESCRIPTION OF THE DRAWINGS

The invention will now be explained based on the examples of embodiments presented in the drawing, the figures of which show as follows:

FIG. 1 is a longitudinal section through a first example of an embodiment of a pressure measuring cell of the invention;

FIG. 2 is a longitudinal section through a second example of an embodiment of a pressure measuring cell of the invention;

FIG. 3 is a longitudinal section through a third example of an embodiment of a pressure measuring cell of the invention;

FIG. 4 is a longitudinal section through a fourth example of an embodiment of a pressure measuring cell of the invention;

FIG. 5 is a longitudinal section through an example of an embodiment of a pressure sensor of the invention; and FIG. 6 is a longitudinal section through an example of an embodiment of a pressure measuring cell of the invention as a pressure difference, measuring cell.

DETAILED DISCUSSION IN CONJUNCTION WITH THE DRAWINGS

The pressure measuring cell 1 shown in FIG. 1 includes a measuring membrane 2 and a platform 3, wherein the measuring membrane is connected pressure-tightly with the platform along a peripheral joint by laser welding. The measuring membrane 2 has essentially a circular, plate shape with a diameter of, for example, 1 cm to 6 cm and a material thickness of not less than 50 μm and not more than, for example, 2500 μm. The platform 3 has here the same diameter as the measuring membrane 2, wherein the material thickness of the platform amounts to several millimeters to several centimeters. Preferably, the platform is so dimensioned that, in the case of a pressure loading of the measuring membrane 2, it experiences, at most, negligible deformation. On a measuring membrane side, end face of the platform 3, a cavity 5 is formed, so that there is formed between the measuring membrane and the platform 3 a pressure chamber 6, in which a reference pressure rules, against which the pressure acting on the side of the measuring membrane facing away from the platform is measured. In the case of a relative pressure sensor, this reference pressure is atmospheric pressure, which is introduced through a duct (not shown) into the pressure chamber 6. In the case of an absolute pressure sensor, pressure chamber 6 is evacuated. The pressure measuring cell 1 can be clamped, for example, axially in a housing (not shown here), wherein, such as previously usual, there lies on a membrane side end of pressure measuring cell a sealing ring 8, which is clamped between the pressure measuring cell and a sealing surface surrounding a housing opening, through which the pressure measuring cell is contactable with a measured medium.

Although the measuring cell 1 shown here has, at first glance, similarities with the pressure measurement cells of the state of the art and with the manner of their mounting in a sensor housing, by forming the joint 4 by means of laser welding, considerable progress is achieved. The distance tolerances of the conventional joint between the platform and the measuring membrane are lessened, so that the separation between the platform 3 and the measuring membrane 2 can then be more precisely set and lessened. Furthermore, the pressure measuring cell is composed, apart from microstructural or macrostructural changes arising, in given cases, due to the welding process in the region of the joint 4, essentially of a largely homogeneous material, so that the different thermomechanical properties between the ceramic materials of measuring membrane and platform, on the one hand, and the conventional materials of the joint, on the other hand, are absent. Therewith, for a given size of the measuring cell, the influence of inhomogeneities is largely eliminated. As a result, a reduction of the diameter of the measuring cell is facilitated, since, in spite of the relative increase of the area of the joint compared with the membrane area, one is not faced with increased disturbances from the joint.

Furthermore, the pressure measuring cell 1 includes a suitable transducer for registering pressure dependent deformation of the measuring membrane. This aspect is, however, not presented in detail here. The transducer can be a capacitive transducer, in the case of which the end faces of the platform 3 and measuring membrane body 2 bounding the pressure chamber are provided with electrodes. Equally, the pressure measuring cell can be a white light, interferometric transducer, for which the pressure chamber side, end face of the measuring membrane body 2 is illuminated through a bore in the platform 3. Thus, a light conductor is inserted into the bore. The light reflected back from the measuring membrane body is captured by the light conductor. The path difference between the light reflected from the measuring membrane and the light reflected on the end face of the light conductor or on a, in given cases, present, window on the platform side is a measure for the separation between measuring membrane and platform and therewith for the pressure acting on the measuring membrane. Furthermore, a resistance transducer can be provided, for which on the inner side of the measuring membrane body corresponding resistance elements are provided, especially in the form of a bridge circuit.

The recess 5 in the end face of the platform 3, whose dimensions are important especially for capacitive transducers and for optical transducers and, in given cases, can play a role for supporting the measuring membrane body 2 in the case of overload, is, for example, first of all, preformed in the green body of the platform 3 and, after firing, subjected to a fine working, for example, by laser ablation, grinding and/or lapping. Furthermore, a platform with a recess can be formed by affixing, for example, by laser welding, a ring, or hollow cylinder, on a planar end face of a cylinder.

The example of an embodiment of a pressure measuring cell 11 shown in FIG. 2 corresponds essentially to the example of an embodiment in FIG. 1, wherein here a measuring membrane 12 is secured on a platform 13 by means of laser welding along a joint 14. The circular disk shaped measuring membrane 12 here does not cover the entire end face of the cylindrical platform 13, but, instead, an annular region of the end face of the platform 13 remains free, on which an elastic sealing ring 18 can be clamped, when the cell is mounted in a sensor housing. As above, the platform includes in its measuring membrane side, end face a cavity 15 for forming a pressure chamber 16 between the measuring membrane body and the platform 13. As regards preparing the cavity, or recess, and as regards the transducer, the explanations with regard to FIG. 1 hold here also. In the case of the example of an embodiment shown here, the joint 14 is now no longer protected by the sealing ring 18, which lies outside of the measuring membrane body on an annular region of the end face of the platform 13. This is possible, because the joint 14 manufactured by laser welding is media resistant, and, thus, can be exposed to the process medium. Insofar as the joint 14 then occupies a clearly smaller fraction of the end face of the platform 13 compared with the total surface of the measuring membrane, the relative importance of microstructural or macrostructural changes due to the welding process decreases in comparison to the example of an embodiment in FIG. 1, to the extent that these microstructural or macrostructural changes have any influence at all.

The examples of embodiments shown in FIGS. 3 and 4 are further developments of the invention with capacitive transducers, wherein the pressure measurement cells have two part platforms.

The pressure measuring cell 21 in FIG. 3 includes a measuring membrane body 22 and a two-part platform 23, which includes a hollow cylinder 23a and a transducer support 23b. In the manufacture of the pressure measuring cell, first of all, the measuring, membrane body 22 is welded to the hollow cylinder 23a along a joint 24. Then an electrode 39 is placed on the side of the measuring membrane body 22 facing the platform. The electrode can be, for example, a tantalum layer or a glass layer with embedded, conducting, interconnected metal particles. After placement of the membrane electrode 39, the transducer support 23b is inserted into the hollow cylinder 23a and at least on the rear side, end face of the platform 23 connected pressure bearing and gas tightly along the lateral surface 32 of the transducer support 23b using a peripheral joint 33. The joint can be prepared especially by welding, wherein equally a joining with an active hard solder, or braze in a high vacuum soldering, or brazing, method or by means of a glass solder can occur. The end face 36 of the transducer support 23b includes two electrodes of essentially equal area, namely a central electrode 37, which is surrounded by an annular electrode 38. Both electrodes have in the resting position of the measuring membrane preferably essentially the same capacitance with the electrode 39 on the measuring membrane body side. This dimensioning of the electrodes enables operation of the capacitive transducer as a differential capacitor.

In a variation of the invention, the entire inner lateral surface of the hollow cylinder 23a can be metallized, for example, with Ta. This can be done especially in one step with the preparation of the measuring membrane electrode 39 in one working step, when the latter should also have a Ta-layer. To the extent that the measuring membrane electrode 39 extends to the lateral surface of the hollow cylinder, and contacts there the metal coating of the lateral surface of the hollow cylinder peripherally, measuring membrane electrode and the metal coating form together a Faraday cage closed toward the end and the lateral surface of the measuring cell, which especially can be placed at circuit ground of a measurement circuit, with which the capacitive transducer can be operated. This variation of the invention relates not only to the example of an embodiment in FIG. 3, but, instead, is implementable in the case of all embodiments of the invention, whose platform includes a hollow cylinder.

The axial positioning of the transducer support 23b in the hollow cylinder 23a can occur, for example, in such a manner that the capacitances between the central electrode 37 and the membrane electrode 39, or between the annular electrode 38 and the membrane electrode 39 are monitored for identifying an axial, desired position of the transducer support, and that the transducer support 39 is affixed in the detected, desired position.

The pressure measuring cell shown here is, in turn, mountable in a sensor housing bearing against an elastic sealing ring 28.

The example of an embodiment shown in FIG. 4 corresponds to the example of an embodiment in FIG. 3, except for the axial positioning of the transducer support relative to the hollow cylinder. In particular, such as in the case of the pressure measuring cell 21, a ceramic measuring membrane 42 is welded to a hollow cylinder 43a of a platform 43 along a peripheral joint 44. Inserted into the bore 45 of the hollow cylinder 43a is a cylindrical section 43c of a transducer support 43b, wherein on the base of the cylindrical section 43c facing away from the measuring membrane a base plate 43d adjoins, which has an outer diameter, which essentially equals the outer diameter of the hollow cylinder 43a. A lateral surface 52 of the cylindrical section 43c of the transducer support 43b serves for lateral orientation of the transducer support 43b relative to the bore 45 of the hollow cylinder 43a. An upper side 54 of the base plate 43d facing the hollow cylinder 43a serves as axial stop for defined axial positioning of the transducer support 43b in the hollow cylinder 43a and therewith relative to the measuring membrane body 42. On an end face 56 of the cylindrical body 43c are again provided a central electrode 57 and a capacitance equal, annular electrode 58, which are positioned opposite an electrode 59 on the measuring membrane. The measuring membrane electrode is emplaced after the measuring membrane 42 has been welded on the hollow cylinder 43a and before the transducer support 43b is inserted and secured. After the positioning of the transducer support 43b, such is affixed along a peripheral joint 55 at the base of the lateral surface of the hollow cylinder 43a. This can occur by welding or by joining by means of an active hard solder, or braze, or glass solder.

The inner surface 25 of the hollow cylinder 23a, the inner surface of the measuring membrane body 22 and the upper surface of the transducer support 23b form a pressure chamber 26, shown in FIG. 3. In FIG. 4, a pressure chamber 46 is also formed by an inner surface of the hollow cylinder 43a, the inner surface of the measuring membrane 42 and the upper surface of the cylindrical section 43c. An elastic sealing ring 48 shown in FIG. 4 acts as does the sealing ring 28 shown in FIG. 3.

The pressure sensor 60 shown in FIG. 5 includes a pressure measuring cell 61, which has a measuring membrane body 62 welded on a platform 63. The platform includes a plurality of components, namely a hollow cylinder 63a and a cylindrical transducer support 63b, with a base plate 63c below. Base plate 63c extends radially beyond the hollow cylinder and is welded along a peripheral weld seam to the base of the lateral surface of the hollow cylinder 63a pressure-tightly with the hollow cylinder 63a. An edge region of the upper end face of the base plate 63c annularly surrounding the hollow cylinder 63a serves as sealing surface 64 for mounting the pressure measuring cell 61 in a sensor housing 70, especially a metal sensor housing 70.

Sensor housing 70 has an opening 71, through which the pressure measuring cell 61 communicates with a space outside of the housing 70. Opening 71 is surrounded by a radially inwardly extending shoulder, which forms an axial abutment surface 72 toward an interior of the housing 70. Positioned between the axial abutment surface 72 and the sealing surface 64 is an elastic sealing ring 73, against which the measuring cell 61 is axially clamped by means of a screw ring 74, wherein the screw ring 74 engages in a screw thread in a wall section of the housing 70. Arranged between the screw ring 74 and the pressure measuring cell is an annular decoupling body 75, which preferably is of the same ceramic material, especially corundum, as the pressure measuring cell, in order to keep mechanical stresses due to thermal expansion differences between the materials of the pressure measuring cell, on the one hand, and the screw ring, on the other hand, away from the pressure measuring cell.

Because of the axial separation between the plane of the frontside of measuring membrane body 62 and the plane of the sealing surface 64, the effects of clamping forces on the measuring membrane are significantly reduced.

Housing 70 has an annular axial protrusion 77, which adjoins the housing opening, in order to protect the pressure measuring cell 61.

FIG. 6 shows, finally, a pressure measuring cell 91, which is embodied as a pressure difference, measuring cell using the one-chamber principle. In such case, a ceramic, cylindrical platform 93 bears ceramic measuring membranes 92a, 92b, on both end faces, in each case welded to the platform. The platform includes two hollow cylinders 93a, 93d, into which, in each case, a cylindrical section 93b, 93e of a central transducer support is inserted. The transducer support includes, furthermore, a base plate 93c, with which the cylindrical sections 93b, 93e are fixedly connected. The diameter of the base plate 93c equals the outer diameter of the hollow cylinders 93a, 93d. The hollow cylinders sit with their bases on annular edge regions 95a, 95b of the two end faces of the base plate 93c, whereby the axial positions of the measuring membranes 92a, 92b relative to the transducer support are defined. The hollow cylinders 93a and 93d are, in each case, welded at the base of their lateral surface pressure-tightly to the base plate 93c along a peripheral weld seam.

Formed between the measuring membranes 92a and 92b and the platform 93 is, in each case, a pressure chamber 96a, 96b, wherein the pressure chambers communicate with one another via a duct 97, which extends through the platform in the form of an axial bore. Pressure chambers 96a, 96b and the duct 97 are filled with a pressure transfer liquid, in order to couple the two measuring membranes hydraulically. FIG. 6 shows the pressure difference, measuring cell equipped with a currently preferred, capacitive transducer. Of course, also here, other transducer principles can be used.

The circuitry and contacting of the electrodes through electrical cable guides are known to those skilled in the art of ceramic pressure measurement cells and, consequently, need not be explored here in detail.

Details for welding ceramic materials are set forth, for example, in the publications of Exner et al. of the Laser Institute Mittelsachsen e.V. in Mittweida, especially: "Laser-welding of functional and constructional ceramics for Microelectronics."

The invention claimed is:

1. A pressure sensor, comprising a pressure measuring cell; and a housing, said housing comprising a housing opening:
    said pressure measuring cell, comprising:
    at least one ceramic measuring membrane body, wherein the measuring membrane body has a pressure-dependently deformable measuring membrane; and
    at least one ceramic platform, wherein said measuring membrane body is connected with said platform along an annular, peripheral joint, wherein:
    said peripheral joint is formed as a welded connection between said measuring membrane body and said platform;
    said platform includes an annular membrane support, to which said measuring membrane body is secured by means of said peripheral joint;
    wherein said pressure measuring cell further includes a central transducer support, which is surrounded by said membrane support;
    wherein an end face of said transducer support includes at least one electrode, which faces said measuring membrane body, wherein said measuring membrane body includes an electrode, which faces said transducer support;
    wherein said transducer support is connected pressure-tightly with said membrane support along at least a second joint;
    wherein said pressure measuring cell includes a bearing surface for a sealing ring, wherein an axial projection of said bearing surface on a plane, in which said joint between said measuring membrane body and said platform is formed, surrounds said peripheral joint;
    wherein said bearing surface for a sealing ring is in a first plane, wherein said first lane is axially spaced from a second plane, in which an outer end face of said measuring membrane extends and, indeed, by at least one fourth diameter of said measuring membrane body;
    wherein said pressure measuring cell is held by said housing, and wherein said pressure measuring cell closes a housing opening, through which said pressure measuring cell communicates with an environment of said housing;
    wherein a sealing ring is clamped between a sealing surface surrounding said opening of said housing and said bearing surface of the pressure measuring cell, such that the joint is exposed to the environment of said housing.

2. The pressure sensor as claimed in claim 1, wherein: said second joint is formed by means of a glass solder.

3. The pressure sensor as claimed in claim 1, wherein: said second joint is formed by means of an active hard solder.

4. The pressure sensor as claimed in claim 1, wherein: said second joint is formed by means of a braze.

5. The pressure sensor as claimed in claim 1, wherein: said second joint is formed by means of welding.

6. The pressure sensor as claimed in claim 1, wherein: said measuring membrane body and/or said platform comprise aluminum oxide (Al2O3).

7. The pressure sensor as claimed in claim 1, wherein: an inner lateral surface of said membrane support has a conductive coating, which, together with an electrode on said surface of said measuring membrane facing said membrane support, forms a Faraday cage closed toward said measuring membrane and said lateral surface.

8. The pressure sensor as claimed in claim 1, wherein:
the pressure measuring cell includes a bearing surface for a sealing ring in a first plane, wherein said first plane is axially spaced from a second plane, in which an outer end face of said measuring membrane extends and, indeed, by at least one eighth diameter, of said measuring membrane body.

9. The pressure sensor as claimed in claim 1, wherein:
the pressure measuring cell includes a bearing surface for a sealing ring in a first plane, wherein said first plane is axially spaced from a second plane, in which an outer end face of said measuring membrane extends and, indeed, by at least one half diameter of said measuring membrane body.

10. The pressure sensor as claimed in claim 1, wherein:
the pressure measuring cell includes a bearing surface for a sealing ring in a first plane, wherein said first plane is axially spaced from a second plane, in which an outer end face of said measuring membrane extends and, indeed, by at least one whole diameter of said measuring membrane body.

11. The pressure sensor as claimed in claim 1, wherein:
the pressure measuring cell is an absolute pressure measuring cell.

12. The pressure sensor as claimed in claim 1, wherein:
the pressure measuring cell is a relative pressure measuring cell.

13. The pressure measuring cell as claimed in claim 1, wherein:
the pressure measuring cell is a pressure difference measuring cell.

* * * * *